United States Patent
Holbert

[11] Patent Number: 5,992,281
[45] Date of Patent: *Nov. 30, 1999

[54] VENEER SCARFING MACHINE

[75] Inventor: John C. Holbert, Corvallis, Oreg.

[73] Assignee: Corvallis Tool Co., Philomath, Oreg.

[*] Notice: This patent issued on a continued prosecution application filed under 37 CFR 1.53(d), and is subject to the twenty year patent term provisions of 35 U.S.C. 154(a)(2).

[21] Appl. No.: 08/801,265

[22] Filed: Feb. 19, 1997

[51] Int. Cl.$^6$ .................................. B26D 7/14; B27L 5/00
[52] U.S. Cl. .................................. 83/176; 83/581; 83/432; 83/869; 144/2.1; 156/258
[58] Field of Search .......................... 83/176, 581, 425.2, 83/432, 472, 869, 17, 20; 144/2.1, 185, 186, 188, 376, 377; 156/258, 304.5; 69/16

[56] References Cited

U.S. PATENT DOCUMENTS

| | | | |
|---|---|---|---|
| 2,314,049 | 3/1943 | Leino | 83/432 X |
| 4,516,451 | 5/1985 | Takeshita et al. | 83/581 X |
| 4,813,319 | 3/1989 | Weyand, Jr. | 83/22 |
| 4,931,113 | 6/1990 | Feichtmeir et al. | 156/258 X |
| 5,372,168 | 12/1994 | Minami | 144/347 |

FOREIGN PATENT DOCUMENTS 2736401  2/1979  Germany ............................. 83/472 X

*Primary Examiner*—Rinaldi I. Rada
*Assistant Examiner*—T. Anthony Vaughn
*Attorney, Agent, or Firm*—Robert L. Harrington

[57] ABSTRACT

An apparatus for scarfing edge portions of a veneer sheet to produce a joint suited for joining the veneer sheets in an edge to edge relation. A conveyor system aligns, conveys and flattens the sheet. The sheet as it is being conveyed is engaged by tapered anvils that deflect edge portions of the sheet at an angle to the plane of the flattened sheet. One anvil on one side deflects one edge portion upward and the anvil on the opposite side deflects the opposite edge portion downward. The resiliency of the sheet maintains the deflect edge portion against the anvil. The sheet is conveyed through scarfing saws which generate a bevel on each of the deflected side edges.

5 Claims, 5 Drawing Sheets

VENEER SCARFING MACHINE

FIELD OF THE INVENTION

This invention relates to veneer scarfing which provides veneer sheets with inter-fitting angle-cut edges that can be overlapped and glued without adding thickness.

BACKGROUND OF THE INVENTION

There are a number of situations where it is desirable to bond two or more sheets of veneer together in edge-to-edge relation. Veneer sheets (peeled from logs or blocks) are thin (e.g., ⅛ inch thick) and inherently contoured in all three dimensions making joining of the sheets difficult. They cannot be satisfactorily abutted square edge to square edge. Overlapped gluing is accomplished by the technique referred to as scarfing. The edges to be joined are cut at a severe angle, e.g., 10–30 degrees from the plane of the sheet which more than doubles the edge surface for gluing and allows for an overlapping of the piece by as much as 1¼ inch, all without adding any thickness in the area of overlap. A secure bond is achieved with this method of gluing.

A problem with scarfing is in making a uniform angled cut along the undulating edges of the sheets so that the edges can be mated one to the other for achieving a smooth juncture of the two edges. The production of such angled cut edges is an objective of the present invention.

BRIEF DESCRIPTION OF THE INVENTION

Applying a flattening force against the sheet, i.e., the sheet being sandwiched between opposing forces, will flatten out the contours. However, the edge portion of the sheet to be cut must be exposed for sawing which prevents the application of a force at both sides adjacent the edges. The preferred embodiment of the present invention solves this problem by applying opposing forces at the main body of the sheet and using forming anvils applied to one side only at the edges which bends or deflects the edges out of alignment with the main body portion. As the sheet edges are formed into an angle relative to the remainder of the sheet, the natural elasticity of the wood acts like an opposing force to flatten out the contours and hold the edges of the sheet tightly against the anvil.

In the preferred embodiment, the edges of the board being pressed against the anvil are angled upwardly along one edge and downwardly along the opposite edge, e.g., at a 30 degree angle. Saws are positioned for cutting in the plane of the sheet and will cut the flattened edges uniformly at the angle deflection, i.e., 10–30 degrees. When gluing, the sheets are overlapped the prescribed distance, glue is applied and top and bottom and opposing forces are applied at these edge areas. This results in the cut edges being properly mated and a secure and smoothly bonded edge is obtained. The invention will be more fully understood upon reference to the following detailed description having reference to the accompanying drawings.

DESCRIPTION OF THE PREFERRED EMBODIMENT

Figures 1, 2:
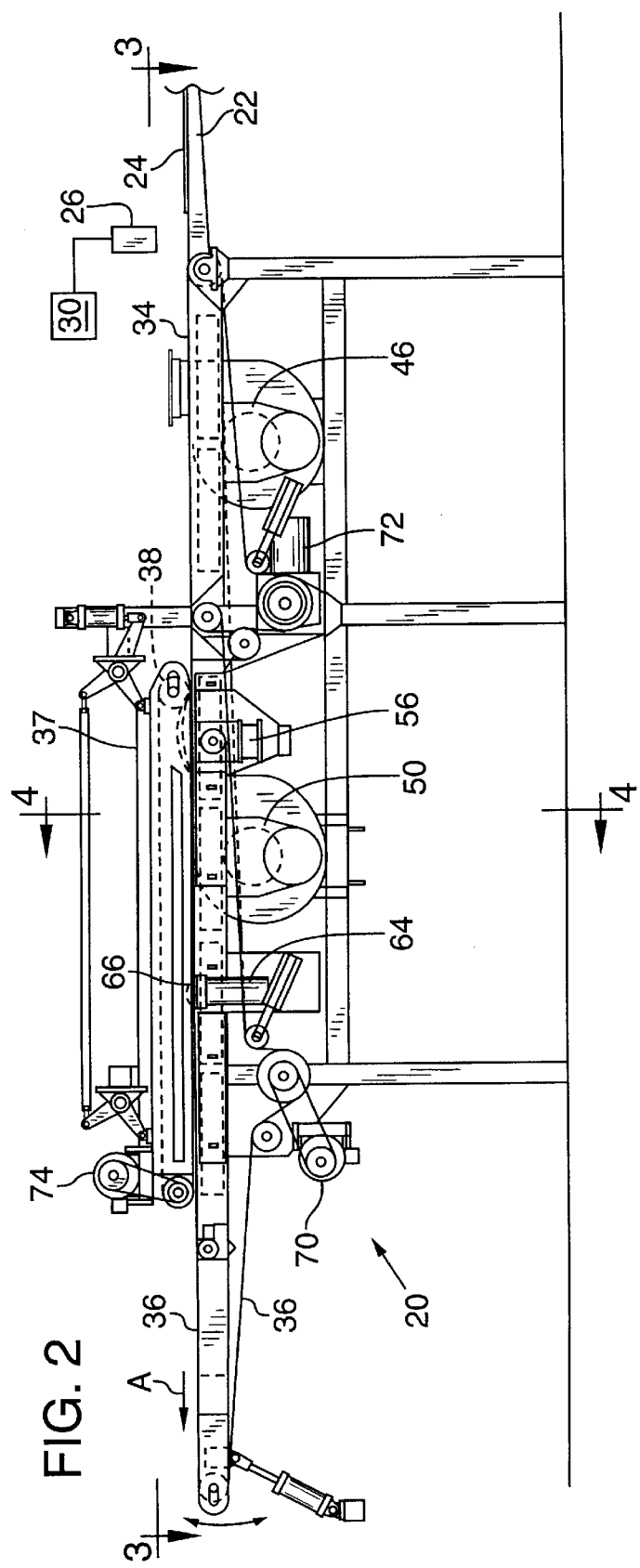
FIG. 1 is a view of veneer sheets having beveled edges formed by the scarfing machine of the present invention.
FIG. 2 is a view of a scarfing machine of the present invention.

Veneer sheets are often joined in an edge-to-edge relation as by gluing. FIG. 1 illustrates two veneer sheets 10 and 12 that have their edges 14 and 16 beveled to provide an effective glue joint for joining the veneer sheets 10 and 12 in an edge-to-edge relationship. The edges 14, 16 must be accurately produced so that a close fitting joint is produced when the sheets 10 and 12 are joined together. The beveled edges 14, 16 are produced on the veneer scarfing machine of the present invention.

FIG. 2 illustrates a scarfing machine 20 of the present invention that is arranged to produce the beveled edges 14, 16 as illustrated in FIG. 1. Veneer sheets are produced by peeling a thin strip of material off of a log. The elongate strip peeled from the log is cut into nominal sizes such as 4'×8' sheets. The veneer sheets are very thin and due to their nature, they do not lie flat but will expand and distort in three dimensions. It is, therefore, necessary to control the edges of the sheet during the scarfing (beveling) process to accurately produce the beveled edges 14 and 16 on the sheets as indicated in FIG. 1. The scarfing machine 20 is arranged to accurately deliver the veneer sheet and to flatten the edges of the sheet during the scarfing process.

Figure 3:
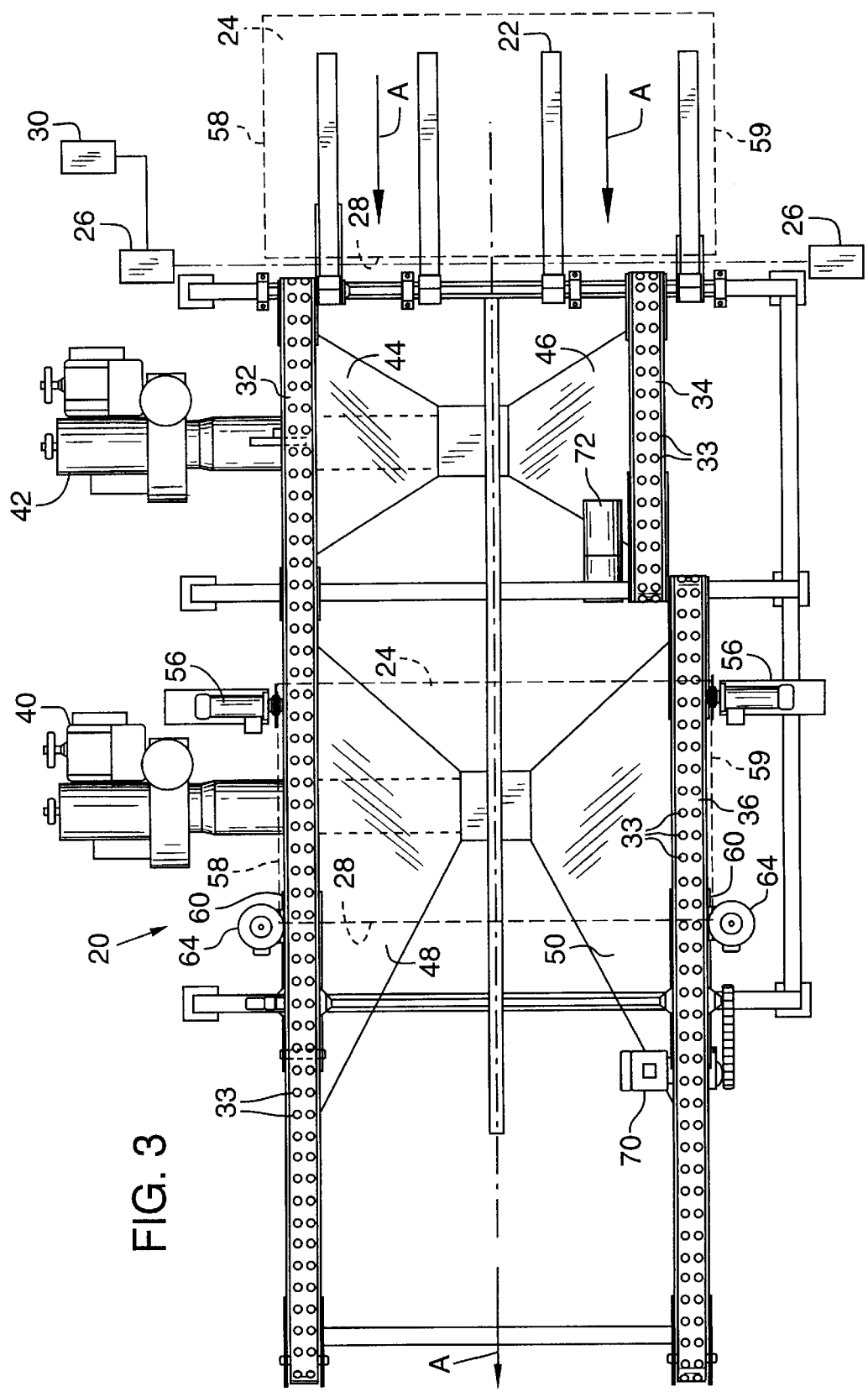
FIG. 3 is a view of the scarfing machine of the present invention as viewed on view lines 3—3 of FIG. 2.

Refer now to FIGS. 2 and 3 of the drawings which illustrates the scarfing machine 20 of the present invention. An infeed conveyor 22 transports veneer sheets 24 to the scarfing machine 20 and sequentially transfers the sheets 24 onto lower conveyor belts 32, 34 of the machine 20 (best seen in FIG. 3). The sheet 24 as it is transferred to the belts 32, 34 is scanned by a scanner 26. The scan data is input to a computer 30. The computer 30 determines whether or not the edge 28 of the sheet 24 is normal to the travel path of the machine 20. The travel path is indicated by arrow A.

The lower belts 32, 34 as well as the other lower belt 36 of the machine 20 (best seen in FIG. 3) are of the perforated type and have perforations 33.

A known vacuum system 40, 42 is provided to apply a vacuum to each of the belts 32, 34 and 36. The vacuum system 40, 42 will thus withdraw air through the perforations 33 of the belts 32, 34 and 36 and thus a veneer sheet 24 on the belts will be forced downwardly onto and gripped by the belts due to the differential air pressure. The force applied by the vacuum also flattens the sheet 24. As seen in FIG. 3, vacuum system 42 has a plenum 44 that withdraws air through a portion of the belt 32 and has a plenum 46 that withdraws air through the belt 34. Vacuum system 40 has a plenum 48 that withdraws air through a portion of the belt 32 and has a plenum 50 that withdraws air through a portion of the belt 36.

The sheet 24 is transferred onto belts 32, 34 of the scarfing machine 20. Should the edge 28 of the sheet 24 be out of square with the scarfing machine 20, the computer will control the belt 34 to either speed up the belt 34 or slow the belt 34 down relative to the belt 32 to pivot the sheet 24 such that the edge 28 is square with the scarfing machine 20. The vacuum applied to the belts 32, 34 will force the sheet 24 downward against the belts 32, 34 and thus the sheet will be gripped by the belts 32, 34. The sheet 24 is essentially gripped at two spaced apart positions and when the belt 34 is either speeded up or slowed down relative to belt 34, the sheet will be pivoted into the desired alignment. When the sheet 24 has been corrected to its square condition, the computer will then drive the belt 34 at the same rate as belt 32.

The belts 32, 34 continue to transport the sheet 24. As shown, belt 32 extends substantially along the length of the machine 20. The conveyor belt 36 is positioned strategic to the belt 34 in an over lapping arrangement. As the sheet 24 progresses it will be continued to be transported by belt 32 along one side edge and the other side edge will be transferred from belt 32 onto the belt 36. Additionally, as shown in FIG. 2, an upper hold down system 37 has belts 38 positioned strategic to the belts 36, 32 and will engage the top side of the sheet 24. The upper hold down belts 38 in addition to aiding in propelling the sheet 24 will force the sheet 24 downward against the belts 32, 36 and thus the sheet 24 will be compressed between the lower belts 32, 36 and the upper belts 38.

A motorized drive assembly 70 is provided to drive the lower belts 32, 36 in unison. A motorized drive assembly 72 is provided to drive the lower belt 34 at a rate controlled by the computer 30. The upper drive belts 38 are driven by a motorized drive assembly 74 in unison with the lower belts 32, 36. The motorized drive assemblies are not detailed since they are of the type known in the industry.

The sheet 24 as it is being transported (by the belts 32, 36 and the upper hold down belts 38) will be flattened due to the downward force exerted by the upper hold down belts 38 onto the sheet 24 received on the lower belts 32, 36. As illustrated in FIG. 3, the lower belt 32 (and an upper hold down belt 38) is in close proximity to one edge portion 58 of the sheet 24 and the lower belt 36 (and an upper hold down belt 38) is in close proximity to the opposite edge portion 59 of the sheet 24. The belts 32, 36 and 38 in combination with the vacuum system will flatten the sheet 24 into a planar surface.

As previously mentioned, belts 32, 36 in combination with the vacuum systems 40, 42 and the upper hold down belts 38 will maintain the sheet 24 in a flattened and squared orientation as the sheet 24 is conveyed through the scarfing machine 20. Saws 56 mounted on each side of the scarfing machine 20 will trim the sides of the edge portions 58, 59 of the sheet 24 to produce a sheet of the desired dimension.

As the sheet 24 progresses past the trimming saws 56, the edges portions 58, 59 of the sheet 24 will be engaged by tapered anvils 60 to deflect the edge portions 58, 59 at an angle relative to the plane of the flattened sheet 24. With reference to FIGS. 4–7, the anvils 60 have an entry section 62 (FIG. 7) that provides a ramp for the edge portions 58, 59 of the sheet 24 to travel on as it enters onto the tapered portion 63 of the anvil 60. The tapered portion 63 is inclined at an angle relative to a plane extending between the belts 32, 36 and thus is at an angle relative to the sheet 24 received on the belts 32, 36. As shown in FIG. 6, one anvil 60 will elevate the edge portion 59 of the sheet 24 to be inclined at an angle relative to the plane of the sheet 24 captured between the belts 32, 36 and the upper belts 38. The normal resiliency of the sheet 24 will tend to force the edge portion 59 of the sheet 24 against the tapered portion 63 of the anvil 60. As seen in FIG. 5, an anvil 60 on one side of the machine 20 is positioned such that the edge portion 59 will be lifted upwardly and an anvil 60 on the opposite side of the machine 20 will be positioned such that the edge portion 58 will be forced downwardly by the anvil 60.

Figure 4:
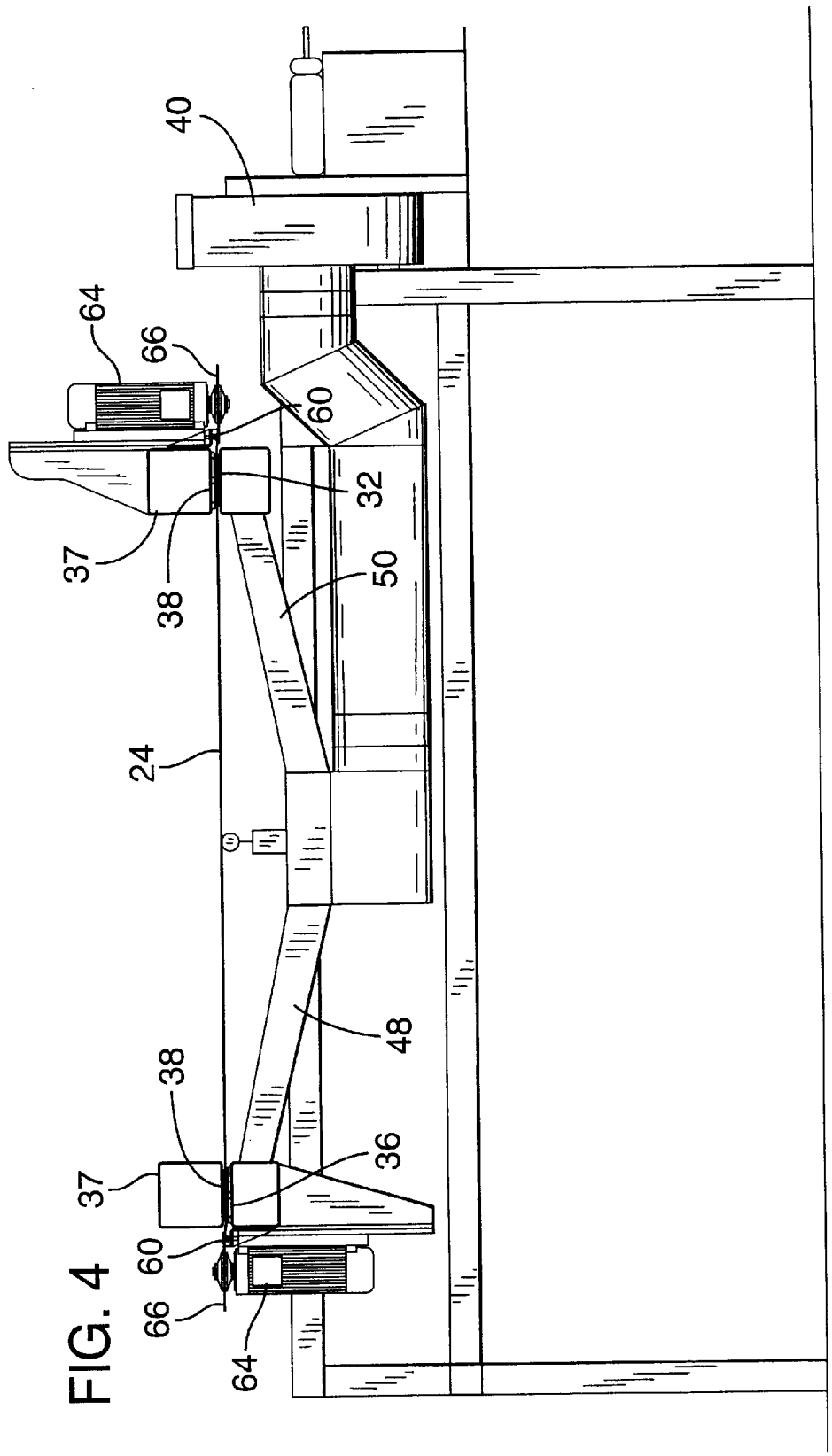
FIG. 4 is a view of the scarfing machine as viewed on view lines 4—4 of FIG. 2.
Figure 5:
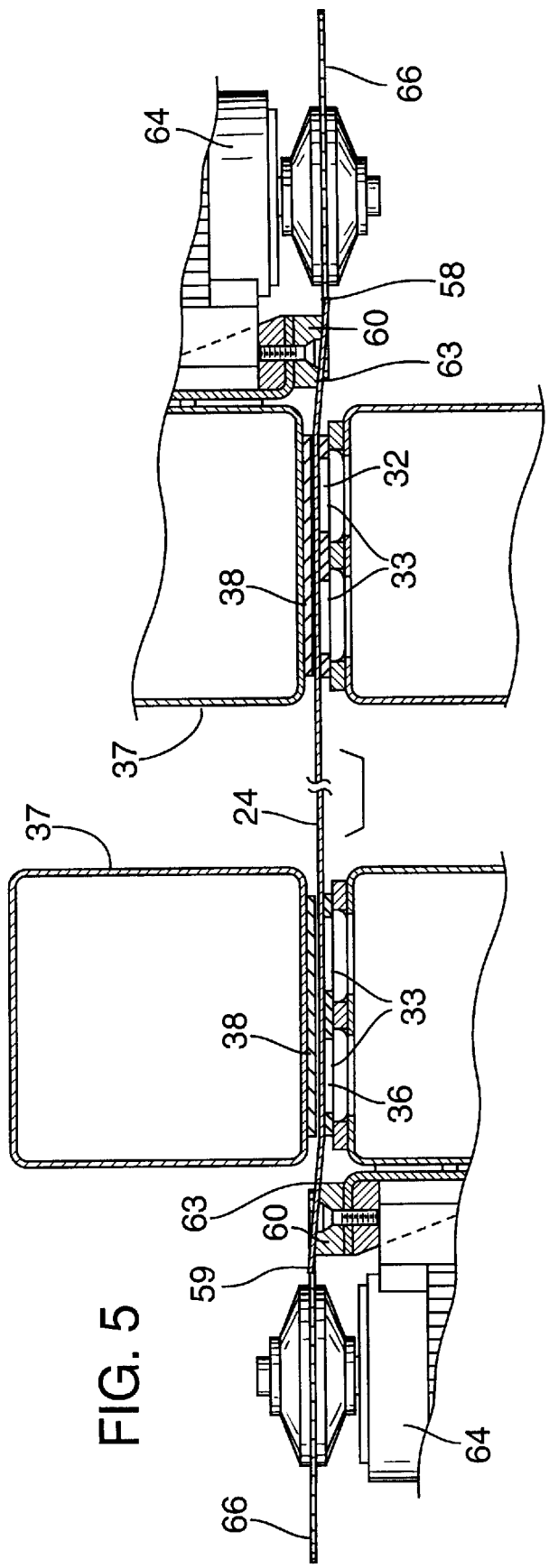
FIG. 5 is an enlarged view of portions shown in FIG. 4 illustrating a veneer sheet in position to be scarfed.
Figure 6:
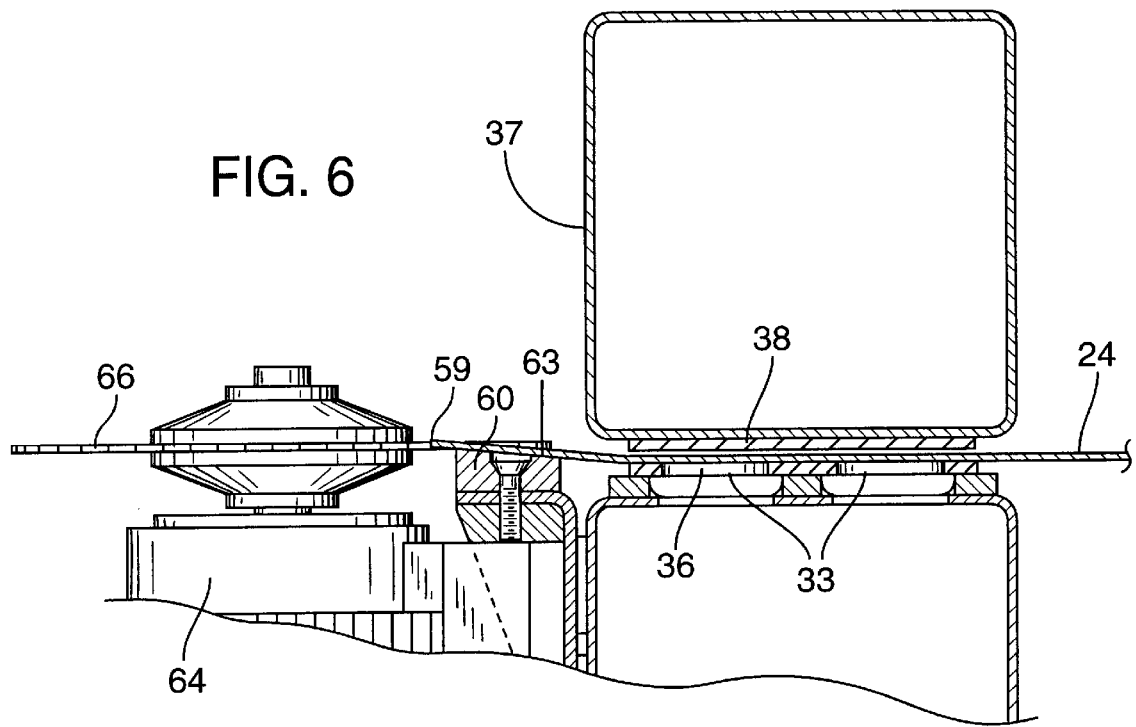
FIG. 6 is a further enlarged view of a portion of FIG. 5 showing a veneer sheet being positioned on an anvil for the scarfing operation.
Figure 7:
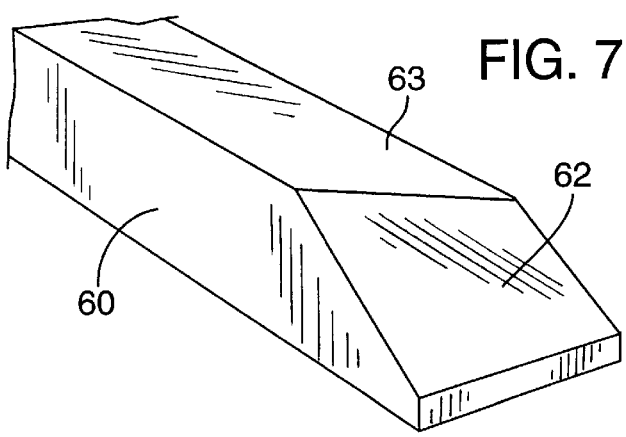
FIG. 7 is a view of a portion of the anvil.

Motorized scarfing saws 64 are positioned strategic to each of the anvils 60 as illustrated in FIGS. 4, 5 and 6. Each of the saws 64 in this embodiment have their blades 66 parallel to the plane of the flattened sheet 24. The sheet 24 as it is conveyed through the saws 64 will have a beveled edge generated on each of the edge portions 58, 59. The sheet 24 as it leaves the scarfing machine 20 thus will have a beveled edge 14 on the edge portion 59 and a beveled edge 16 formed on its edge portions 58 as is shown on sheet 12 of FIG. 1.

It will be appreciated to those skilled in the art that the saws 64 may have their blades 66 inclined at an angle relative to the plane of the sheet 24 received on the belts 32, 36 and that the tapered portion 63 of the anvil 60 may be varied accordingly to produce the desired bevel on each of the edge portions 58, 59.

Those skilled in the art will recognize that modifications and variations may be made without departing from the true spirit and scope of the invention. The invention is therefore not to be limited to the embodiments described and illustrated but is to be determined from the appended claims.

I claim:

1. An apparatus for scarfing an edge of a veneer sheet having opposed a side edge portion, comprising:

a conveyor system for conveying and flattening a veneer sheet into a substantially flat surface defining a plane, said conveyor system defining a path of travel for a side edge portion of the veneer sheet;

an anvil positioned adjacent the conveyor system said anvil having a surface angled relative to the plane and in the path of travel of a side edge portion, said surface receiving and angularly deflecting said side edge portion of the veneer sheet thereby to orient the edge portion at an angle to the plane of the veneer sheet;

a saw having a blade positioned relative to the anvil and angularly projected relative to the surface of the anvil and thereby to the edge portion of the veneer sheet received on said surface for scarfing the edge portion of the sheet to produce a beveled edge on the sheet.

2. An apparatus for scarfing edges of a veneer sheet as defined in claim 1, wherein:

said conveyor system includes a position adjusting conveyor for adjusting the sheet into a squared position up stream of the anvil and saw.

3. An apparatus as defined in claim 1 wherein said angled surface of said anvil has a first angled surface portion that deflects the edge portion out of the plane of the sheet and a second angled surface portion that retains the edge portion at a desired angle relative to said saw blade for scarfing.

4. An apparatus as defined in claim 3, wherein:

a second anvil is positioned in the path of the other side edge portion of the veneer sheet, one of said anvils deflecting said one side edge portion upwardly and the other of said anvils deflecting the opposed side edge portion downwardly, and a second saw having a second saw blade positioned relative to said second anvil for scarfing said opposed side edge portion.

5. An apparatus as defined in claim 4, wherein:

said saw blades of said saws are extended in a plane parallel to the plane of the flattened sheet.

\* \* \* \* \*